United States Patent [19]

Yamazaki

[11] Patent Number: 4,965,590
[45] Date of Patent: Oct. 23, 1990

[54] IMAGE PRINTING APPARATUS

[75] Inventor: Shigeru Yamazaki, Tokyo, Japan

[73] Assignee: Ricoh Company, Ltd., Tokyo, Japan

[21] Appl. No.: 284,536

[22] Filed: Dec. 15, 1988

[30] Foreign Application Priority Data

Dec. 17, 1987 [JP] Japan .............................. 62-317480
Sep. 3, 1988 [JP] Japan .............................. 63-221153

[51] Int. Cl.⁵ ...................... G01D 9/42; G01D 15/24
[52] U.S. Cl. .................................. 346/108; 346/136
[58] Field of Search ...................... 346/1.1, 108, 136

[56] References Cited

U.S. PATENT DOCUMENTS

| | | | |
|---|---|---|---|
| 4,059,833 | 11/1977 | Kitamura et al. | 346/108 |
| 4,201,994 | 5/1980 | Hoshito et al. | 346/108 |
| 4,234,931 | 11/1980 | Kanaiwa et al. | 346/108 X |
| 4,686,541 | 8/1987 | Rosier | 346/108 |
| 4,695,849 | 9/1987 | Dei | 346/108 X |
| 4,704,698 | 11/1987 | Reiniger | 346/108 X |
| 4,814,792 | 3/1989 | Yamanobe et al. | 346/108 |
| 4,843,405 | 6/1989 | Morikawa et al. | 346/1.1 |

FOREIGN PATENT DOCUMENTS 60-123873 2/1985 Japan .

Primary Examiner—George H. Miller, Jr.
Attorney, Agent, or Firm—Cooper & Dunham

[57] ABSTRACT

An image printing apparatus includes first and second write-width determining circuits. The first write-width determining circuit determines a first write-width in a first direction of the paper by using paper size information for the paper and a first counted value obtained by counting the write clock signal. The second write-width determining circuit determines a second write-width in a second direction of the paper by using the paper size information and a second counted value obtained by counting a number of the recording performed for every scanning line, the second direction being perpendicular to the first direction and corresponding to a direction of a paper transportation. The image signal supplied to a light source is recorded on an area of a recording medium corresponding to an area on the paper defined by the first and second write widths.

12 Claims, 8 Drawing Sheets

TRANSPORTATION  TRANSPORTATION

IMAGE PRINTING APPARATUS

BACKGROUND OF THE INVENTION

The present invention generally relates to an image printing apparatus such as a printer, a copier and a facsimile machine, and more particularly, to an image printing apparatus capable of printing the entire area of a sheet of paper.

FIG. 1 shows a structure of a laser printer which is one of the image printing apparatuses. Referring to FIG. 1, one of sheets of paper stacked in paper feeding units 1 is fed due to the function of a pair of resist rollers 2, toward an electrostatic latent image carrier 3 constituted by a drum-shaped photosensitive member. The photosensitive drum 3 is rotated clockwise. During this time, a circumferential surface of the photosensitive drum 3 is electrified by a charger unit 4. Then, an electrostatic latent image is formed on the surface of the photosensitive drum 3 by irradiating laser beam thereon by using a write unit 5 (an optical scanning unit). When the latent image passes a develop unit 6, it is changed to a visual image by toner particles supplied from the develop unit 6. Then the visual image is transferred to the paper by an image transfer charger 7. Thereafter, the paper is detached from the photosensitive drum 3 by a paper detaching charger 8. Then the visual image on the paper is fixed by a fixing unit 9. Finally, the paper having the fixed image is ejected to an ejection part 10 or a side-tray 11 In FIG. 1, the side-tray is kept in a folded state After the image transfer, toner particles remaining on the photosensitive drum 3 are removed by a cleaning unit 12. Then the photosensitive drum 3 is discharged by a discharger unit 13 The laser printer further includes an exposure unit 14, a controller 15, a reversing part 16 for both-side printing, a drive motor 17, and a power supply unit 18.

Conventionally, when an image is printed on paper, as shown in FIG. 2, a peripheral surface area on the paper is kept blank, and an image is printed in an image printing area R (a shading area) surrounded by the peripheral area The illustrated paper is of a letter size (11 inches long, 8½ inches wide; a blank area is ¼ inches long and wide).

The reason why the image printing area R surrounded by the blank area is used, is described below. In a case where black pixels are printed in the entire of a front portion A or B in a paper feeding direction (longitudinal paper feeding having a direction indicated by an arrow (a), or lateral paper feeding having a direction indicated by an error (b)), it becomes difficult to detach the paper from the photosensitive drum 3 by the paper detaching charger 8, because the paper adheres to the photosensitive drum 3. This causes paper jamming The presence of the blank area A, B prevents paper jamming.

In a case where the fixing part 9 carries out image fixing by using a heat roller, if black pixels are printed on the entire of the front portion A or B, the paper adheres to the heat roller. Therefore, it is prevented from being detached from the heat roller. This causes paper jamming. The presence of the blank area prevents paper jamming.

For the above-mentioned reasons, the peripheral area of the paper is intentionally kept blank.

A paper detaching belt type laser printer is known. In this type, a non-image printing area is provided on a right or left side of the paper with respect to the direction of paper feeding. The non-image printing area facilitates to detach the paper from the photosensitive drum 3.

FIG. 3 shows essential parts of a conventional paper detaching belt type laser printer. A paper detaching belt 80 is arranged at an end of the photosensitive drum 3. When a sheet of paper 19 is transported in a direction of the arrow, a non-image printing area 19B (a hatched portion) is obtained due to the function of the paper detaching belt 80. In both the cases of the longitudinal paper feeding and lateral paper feeding, one side of the paper is used as a transportation reference. Therefore, an image is inhibited from being printed in an area on the one side of the paper, namely the non-image printing area 19B. As a result, in the case of the longitudinal paper feeding, it is impossible to print a reference marks used as a reference when forming punch holes In addition, it is necessary to prepare different types of feeding rollers 81 in order to handle different types of sheets of paper. In a case where a single feeding roller is provided for different paper sizes, paper jamming and skews may occur frequently.

As described previously, in conventional image printing apparatuses, after an image is transferred to paper, or is fixed thereon, the paper is detached from those parts Then the image printing area R is determined in accordance with paper sizes in order to prevent the occurrence of paper jamming, and the front portion A or B of the paper is intentionally kept blank.

However, in the conventional image printing apparatuses, it is impossible to print reference marks for punch holes Hence, it is inevitable that paper is folded in half, and a crease is used as a reference mark for forming punch holes Further, it is impossible to print points which represent pitches of a section paper, on an end portion of the paper. This is inconvenient in practical use

SUMMARY OF THE INVENTION

It is therefore a general object of the present invention to provide a novel and useful image printing apparatus in which the aforementioned disadvantages are eliminated.

A more specific object of the present invention is to provide an image printing apparatus capable of printing an image on the entire surface of paper without failing to detach the paper from parts such as a photosensitive drum and a heat roller The above objects of the present invention can be achieved from an image printing apparatus comprising a recording mechanism for optically recording an image on a recording medium for every scanning line in synchronism with a write clock signal, by turning ON/-OFF a light source included therein in accordance with an image signal supplied thereto; a printing mechanism for printing the image formed on the recording medium on paper while transporting the paper; a first write-width determining circuit for determining a first write-width in a first direction of the paper by using paper size information for the paper and a first counted value obtained by counting the write clock signal; a second write-width determining circuit for determining a second write-width in a second direction of the paper by using the paper size information and a second counted value obtained by counting a number of the recording performed for every scanning line, the second direction being perpendicular to the first direction and corresponding to a direction of a paper transportation; and a controller for controlling the image signal supplied to the light source so as to be recorded on an area of the recording medium corresponding to an area on the paper defined by the first and second write widths supplied from the first and second write-width determining circuits.

Other objects, features and advantages of the present invention will become apparent from the following detailed description when read in conjunction with the accompanying drawings.

BRIEF DESCRIPTION OF THE DRAWINGS

FIG. 8 is a block diagram of another preferred embodiment of the present invention based on the paper detachment system.

DETAILED DESCRIPTION

A description is given of a preferred embodiment of the present invention.

Figure 4:
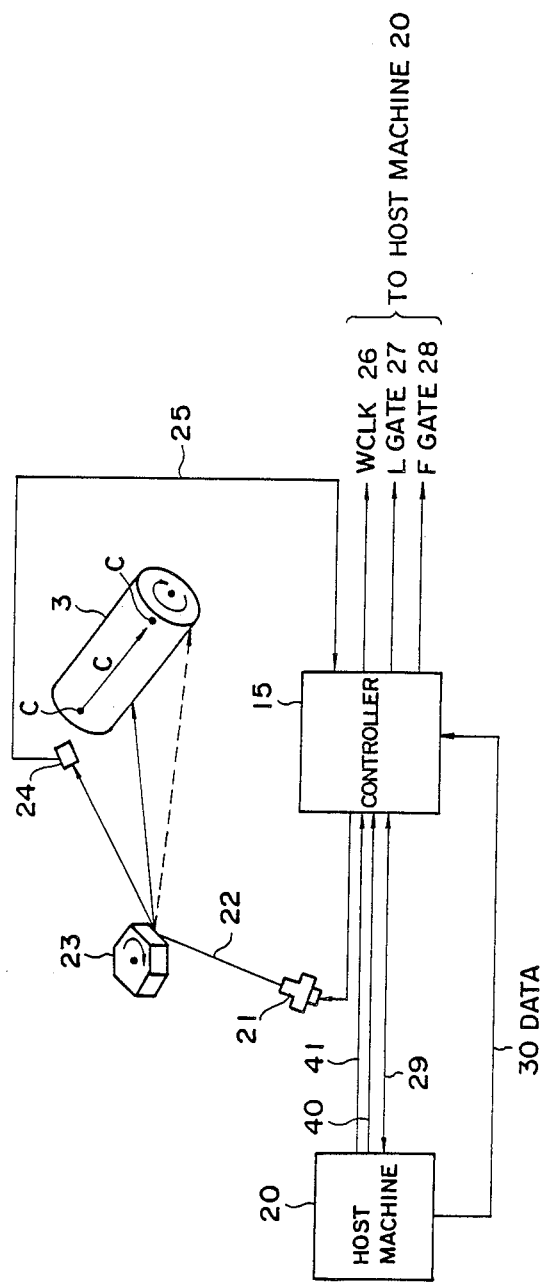
FIG. 4 is a view showing a basic structure of a preferred embodiment of the present invention.

Referring to FIG. 4, a host machine 20 supplies a controller 15 with paper size information in response to a request from the controller 15. The paper size information may be provided by a key (not shown). A laser diode 21 emits a laser beam, which is turned ON/OFF in accordance with an image signal supplied from the controller 15. A polygon mirror 23 scans a circumferential surface of the photosensitive drum 3 in a main scanning direction indicated by an arrow C. During the scan, the photosensitive drum 3 is rotated clockwise (in a sub scanning direction). A scanning range in the main scanning direction C is between points C1 and C2. A synchronization detector 24 detects the start of image writing (a synchronization position) for every scanning line, and sends a synchronization signal to the controller 15. The controller 15 generates a write clock signal WCLK 26 which changes for every dot, a write-width gate signal LGATE 27 related to the main scanning direction, a write-width gate signal FGATE 28 related to the sub scanning direction, and other control signals described later. The write-width gate signal LGATE 27 defines a write width in the main scanning direction of the photosensitive drum 3, which corresponds to a direction perpendicular to the direction of paper transportation. On the other hand, the write-width gate signal FGATE 28 defines a write width in the sub-scanning direction of the photosensitive drum 3, which corresponds to the direction of the paper transportation. Various signals including the paper size information 29 and image data DATA 30 are sent and received between the controller 15 and the host machine 20.

Figure 5:
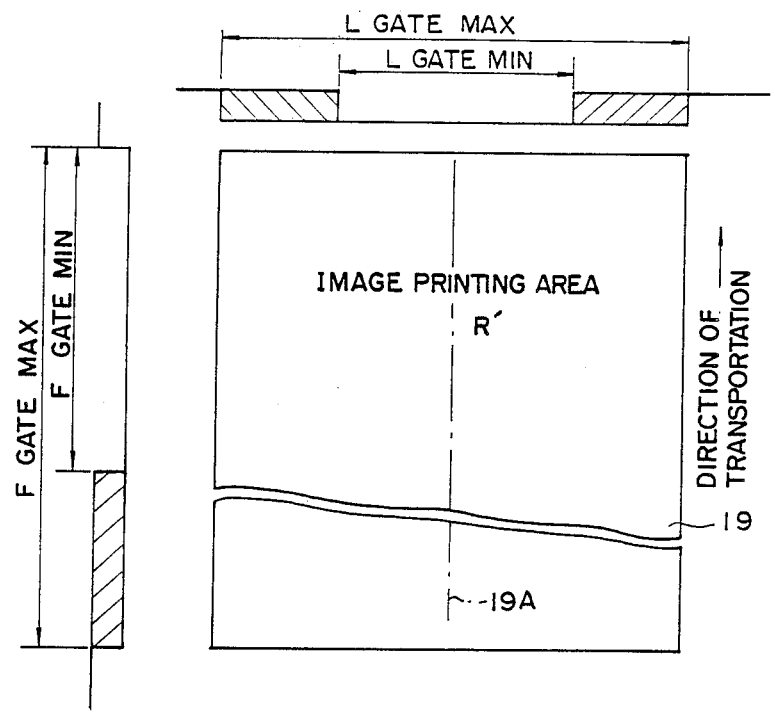
FIG. 5 is a view illustrating a maximum write width in each of the main scanning direction and the sub scanning direction.

Referring to FIG. 5, LGATE MAX denotes a maximum of the write width in the main scanning direction, and LGATE MIN denotes a minimum of the write width therein. LGATE MAX and LGATE MIN depend on the paper size. FGATE MAX and FGATE MIN denote maximum and minimum of the write width in the sub scanning direction, or the paper transportation direction. FGATE MAX and FGATE MIN depend on the paper size. The paper is transported by using, as a reference for the paper transportation, a center 19A of the paper with respect to a maximum write width in the main scanning direction defined in the specification of the apparatus. Thereby, an image printing area R' is defined.

With respect to the write width in the main scanning direction, the controller 15 supplies the host machine 20 with the maximum write width LGATE MAX. Then the host machine 20 sends the controller 15 the image data 30 in accordance with the paper size defined by the maximum width LGATE MAX. That is, the image data contains blank data for an area except for the image printing area R'. In this case, there is no need for controlling the write width LGATE so as to conform to the paper size.

Figure 1:
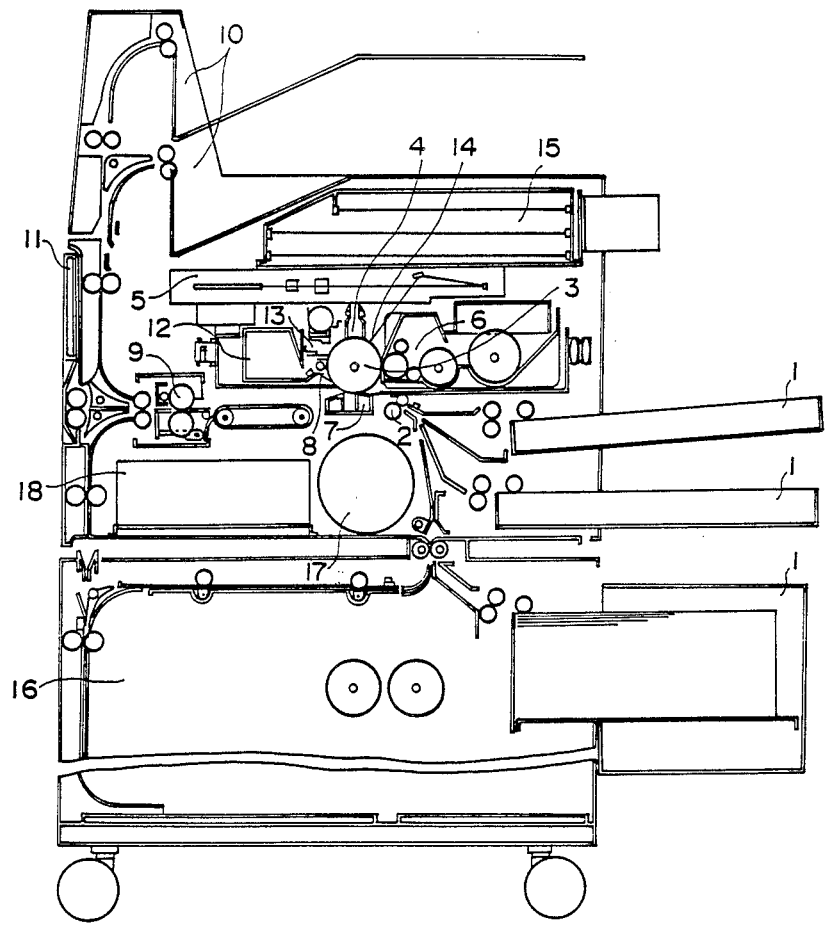
FIG. 1 is side view of a laser printer.
Figure 2:
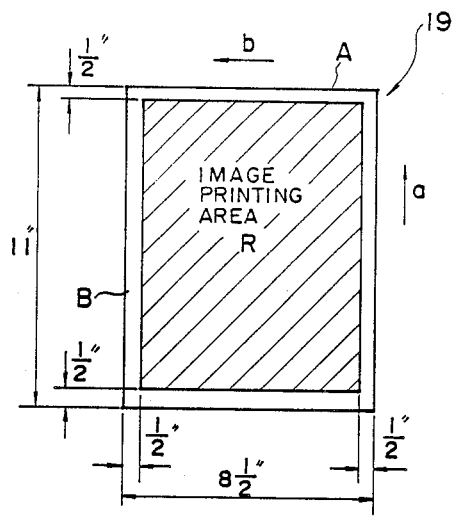
FIG. 2 is a view illustrating the image recording area R on paper.
Figure 3:
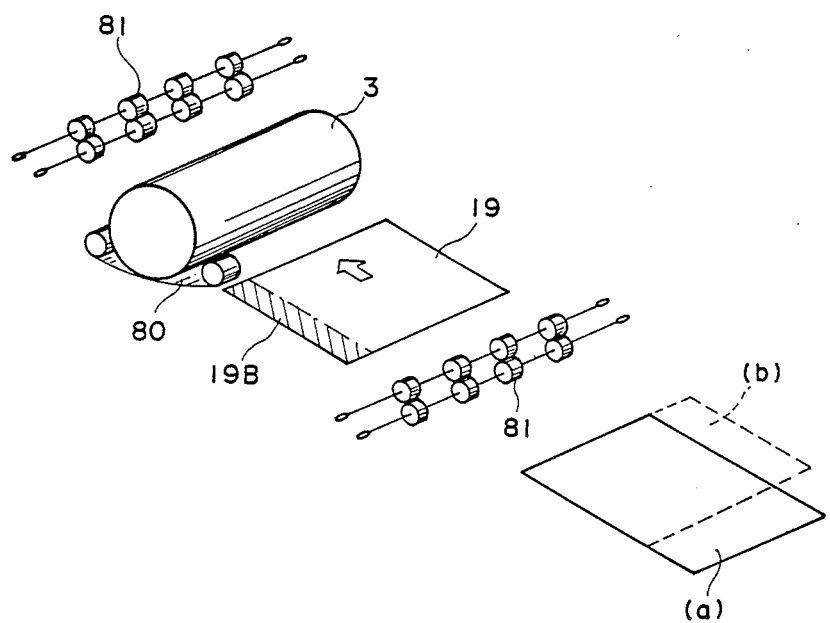
FIG. 3 is a perspective view illustrating a paper transportation mechanism based on a detachment belt system.

It is noted that although with the above-mentioned structure, it becomes possible to print images on the entire area of paper, only a reference mark for punch holes, points of a section paper and the like are printed in an area corresponding to the non-image printing area 19B shown in FIG. 3.

Figure 6:
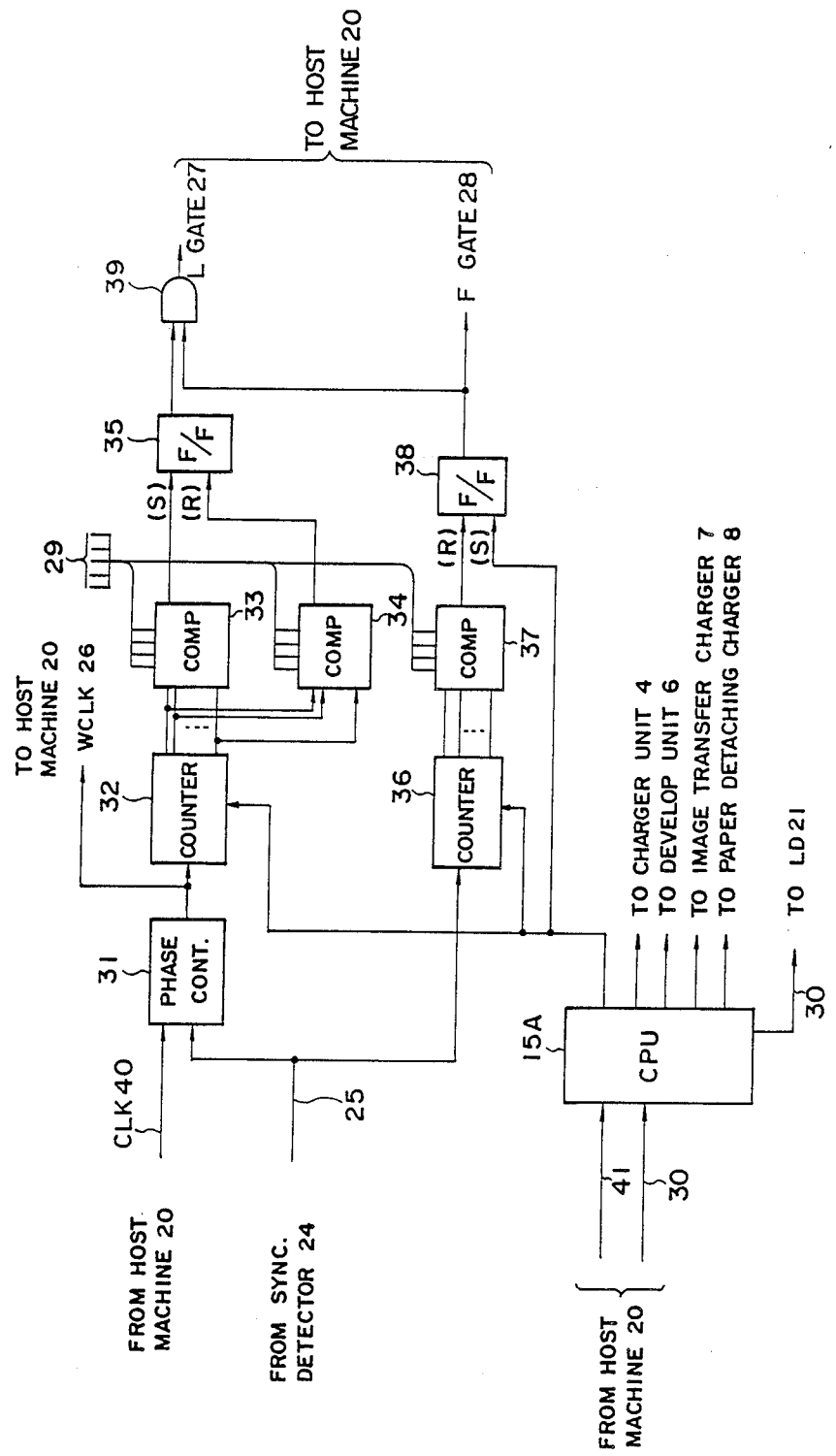
FIG. 6 is a diagram of a controller 15 shown in FIG. 4.
Figure 7:
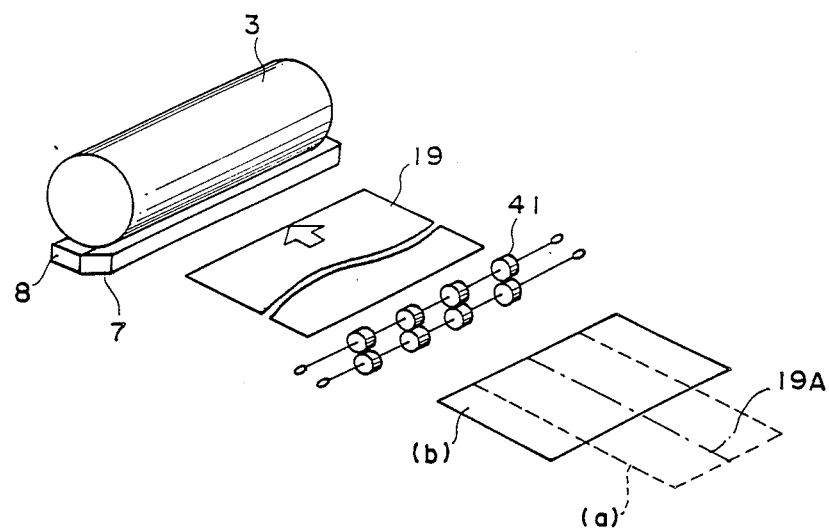
FIG. 7 is a perspective view showing a basic structure of a paper detaching belt type transportation mechanism based on a detachment belt system.

FIG. 6 is a block diagram of essential parts of the controller 15 with respect to the write-width signal LGATE 27 with respect to the main scanning direction and the write-width signal FGATE 28 with the sub scanning direction. Referring to FIG. 6, a phase controller 31 controls a phase between a clock signal CLK 40 having a frequency corresponding to one pixel and the synchronization detection signal 25 supplied from the synchronization detection part 24. The clock signal CLK 40 is supplied from the host machine 20. Then, the phase controller 31 generates the write clock signal WCLK 26, which is supplied to the host machine 20 and a counter 32. The counter 32 counts the write clock signal WCLK 26. The paper size information 29 is supplied from the host machine 20 to comparators 33, 34 and 37 used for determining the image printing area R'. In detail, a value corresponding to a write starting position in the main scanning direction is supplied to the comparator 33, and a value corresponding to a write ending position in the main scanning direction is supplied to the comparator 34. The comparators 33 and 34 compare a counted value supplied from the counter 32 with the respective set values When the counted value becomes equal to the value set in the comparator 33, the comparator 33 sets a flip-flop 35. That is, when the scan reaches the write starting position in the main scanning direction, the flip-flop 35 is set. Then when the counted value becomes equal to the value set in the comparator 34, the comparator 34 resets the flip-flop 35. That is, when the scan reaches the write ending position in the main scanning direction, the flip-flop 35 is reset.

A counter 36 counts the synchronization detection signal 25. A counted value in the counter 36 is supplied to the comparator 37. The comparator 37 compares the counted value supplied from the counter 37 with a value corresponding to a paper size in the sub scanning direction corresponding to the transportation direction When the counted value becomes equal to the set value, the comparator 37 resets a flip-flop 38. That is, the comparator 37 determines the write ending position in the direction of the paper transportation. An output signal of the flip-flop 38 is served as the write-width signal FGATE 28 related to the sub scanning direction (or transportation direction). The write-width signal FGATE 28 thus formed is supplied to the host machine 20 and an AND gate 39, which is also supplied with an output signal of the flip-flop 35. An output signal of the AND gate 39 is served as the write-width signal LGATE 27 related to the main scanning direction. The write-width signals LGATE 27 and FGATE 28 may be high-active or low-active signals.

In operation, an exposure starting signal 41 is supplied from the host machine 20 to a central processing unit (hereinafter simply referred to as a CPU) 15A. In response to the exposure starting signal 41, the CPU 15A sets the flip-flop 38, and clears the counters 32 and 36. Further, the CPU 15A turns ON the charger unit 4, the develop unit 6, the transfer charger 7, the paper detaching charger 8. When detecting the laser beam emitted from the laser diode 21, the synchronization detector 24 generates the synchronization detection signal 25, which is supplied to the phase controller 31. The clock signal CLK 40 supplied to the phase controller 31 is controlled in accordance with the synchronization detection signal 25. Thereby, the write clock signal WCLK 26 is generated by the phase controller 31, and is supplied to the host machine 20 and the counter 32. The counter 32 counts the write clock signal WCLK 26. The counted value in the counter 32 is supplied to the comparators 33 and 34. The write starting and ending positions C1 and C2 (shown in FIG. 4) in the main scanning direction, are set in the comparators 33 and 34 by the paper size information 29 supplied from the host machine 20. Therefore, when the counted value from the copier 32 becomes equal to the value of the write starting position, the comparator 33 sets the flip-flop 35. Then, when the counted value becomes equal to the value of the write ending position, the comparator 34 resets the flip-flop 35. That is, during the write area, the flip-flop 35 is kept in the set state.

On the other hand, the write width in the sub scanning direction (direction of the paper transportation) starts when the flip-flop 38 is set by the CPU 15A, as described previously. The counter 36 counts the synchronization detection signal 25, and supplies the comparator 37 with the counted value. When the counted value becomes equal to the value set by the paper size information 29 supplied from the host machine 20, the counter 37 resets the flip-flop 38. The output signal of the flip-flop 38, or the write-width gate signal FGATE 28 with respect to the sub scanning direction, is supplied to the AND gate 39. During a time when the scan is carried out within the write width, the flip-flop 38 is kept in the set state, and thereby the AND gate 39 passes the output signal of the flip-flop 35. The output signal of the AND gate 39 is the write-width signal LGATE 27 in the main scanning direction. The image data 30 may include data of the reference mark for punch holes and lines of section paper The reference mark for punch holes and lines of section paper can be printed in the vicinity of ends of paper.

A description is given of another embodiment of the present invention with reference to FIGS. 7 through 10.

Referring to 7, the image transfer charger 7 and the paper detaching charger 8 positioned in its vicinity, are arranged in the vicinity of the longitudinal axis of the photosensitive drum 3. The paper detaching charger 8 is used to detach the paper 19 from the photosensitive drum 3. With respect to both the longitudinal and lateral paper feeding directions, the paper 19 can be transported toward the photosensitive drum 3 so that the center 19A of the paper 19 is used as the reference. Therefore, the illustrated paper transportation mechanism is symmetrical, so that it becomes possible to handle various types of sheets of paper by a paper feeding roller 41 having a miniaturized structure can be employed.

Figures 8A, 8B:
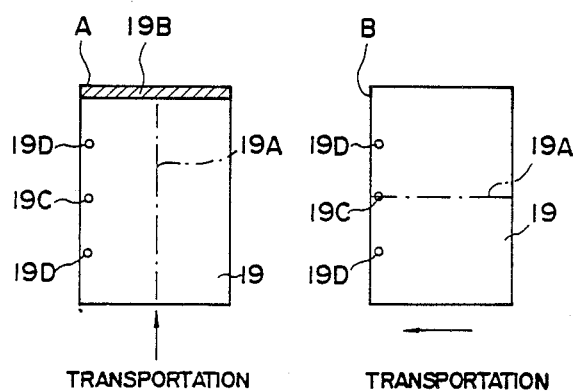
FIGS. 8A and 8B are views showing the direction of paper transportation and an image of a reference mark to be printed on the paper.

In a case of the longitudinal paper feeding shown in FIG. 8A, punch holes 19D are provided in the left side of the paper 19. Therefore, it is possible to print a reference mark 19C. A front portion A in the longitudinal direction of the paper 19 is only served as the non-image printing area 19B. The presence of the non-image printing area 19B makes it easy for the paper 19 to be detached from the photosensitive drum 3. On the other hand, in a case of the lateral paper feeding shown in FIG. 8B, punch holes 19D are provided in a front portion B of the paper in the lateral direction Therefore, the reference mark 19C can be printed.

Figure 9:
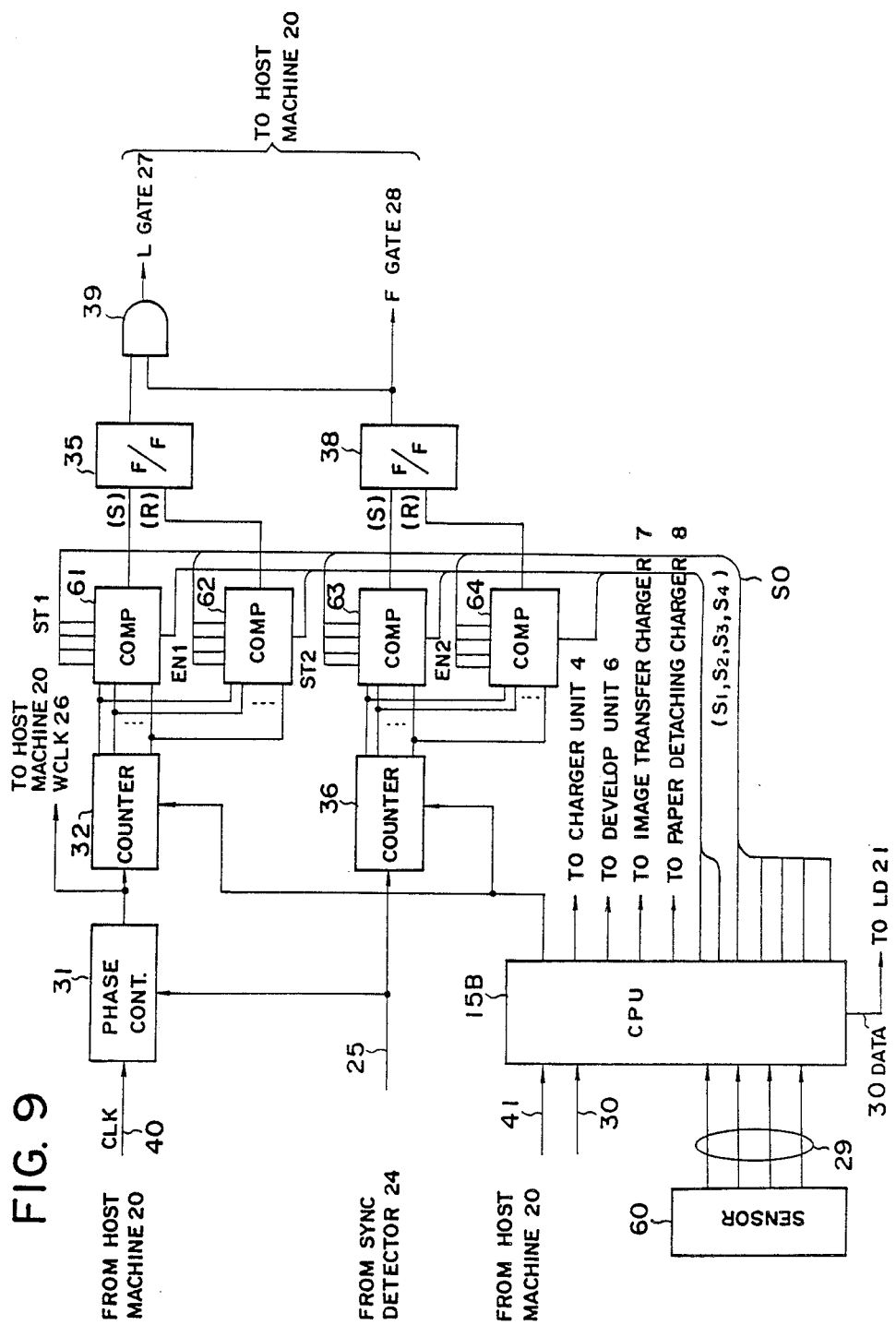
Figure 10:
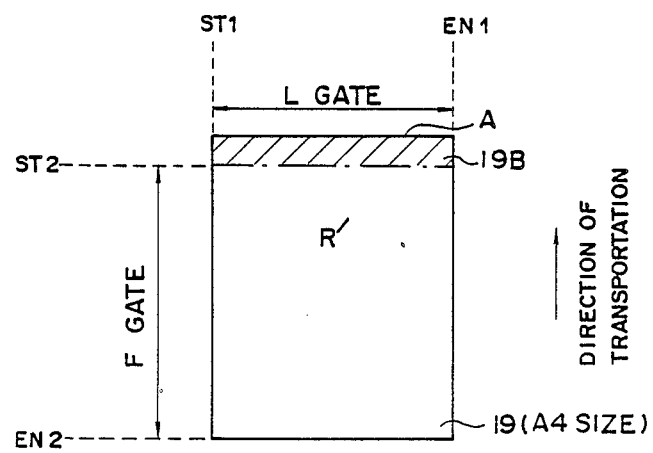
FIG. 10 is a view illustrating a set value SO used in the embodiment of FIG. 9.

FIG. 9 is a block diagram of the controller 15 designed to control the longitudinal and lateral paper feedings shown in FIGS. 8A and 8B. In FIG. 9, those parts which are the same as those in FIG. 6 are given the same reference numerals A block 60 denotes paper feeding/size sensors (hereinafter simply referred to as a sensor) 60 detects various sizes of sheets of paper stacked in the paper feeding units 1 and paper feeding directions, and generates the paper size information 29 therefrom, which is sent to a CPU 15B. Comparators 61 to 64 are used for determining the image printing area R'. For example, in a case when the paper feeding shown in FIG. 10 is selected, the CPU 15B provides the comparators 61–64 with set signals S1 to S4, respectively. In response to the set signals S1–S4, an image printing area setting value SO is set in the comparators 61–64. The image printing area setting value SO consists of values ST1, EN1, ST2 and EN2. The values ST1 and EN1 define the write starting and ending position in the main scanning direction, respectively. The values ST2 and EN2 define write starting and ending positions in the sub scanning direction, respectively. The values ST1, EN1, ST2 and EN2 determine the image printing area R'. In this case, the comparator 63 is supplied with, as the value ST2, a value corresponding to an inner portion by ½ inches from the front end A of the paper 19. For example, a value amounting to 150 dots is set in the comparator 63 in a case where the image printing density is 300 dots per inch. The comparators 61 and 62 are supplied with, as values ST1 and EN1, values indicating the left and right side ends of the paper 19, respectively. The comparator 64 is supplied with, as the value EN2, a value indicating the lowermost end of the paper 19.

In the lateral paper feeding as shown in FIG. 8B, the setting of the non-image printing area is not carried out. That is, the entire area of the paper is set in the comparators 61–64.

In operation, the exposure starting signal 41 is supplied from the host machine 20 to the CPU 15B. Then the CPU 15B clears the counters 32 and 36. When the paper size information 29 is supplied from the sensor 60 to the CPU 15A, the write clock signal WCLK 26 is supplied to the counter 32, and the synchronization detection signal 25 from the synchronization detector 24 is supplied to the counter 36. Then the counters 32 and 36 start counting. The counted value of the counter 32 is supplied to the comparators 61 and 62, and the counted value of the counter 36 is supplied to the comparators 63 and 64. When the counted value supplied from the counter 32 becomes equal to the value ST1 corresponding to the write starting position in the main scanning direction shown in FIG. 10, the comparator 61 sets the flip-flop 35. Similarly, when the counted value supplied from the counter 36 becomes equal to the value ST2 corresponding to the write starting position in the sub scanning direction, the comparator 63 sets the flip-flop 38. Then when the counted value supplied from the counter 32 becomes equal to the value EN1 corresponding to the write ending position in the main scanning direction, the comparator 62 resets the flip-flop 35. Then the CPU 15B clears the counter 32. Then the synchronization detection signal 25 is supplied to the counter 36 and the phase controller 31. Finally, when the counted value supplied from the counter 36 becomes equal to the value EN2 corresponding to the write ending position in the sub scanning direction, the comparator 64 resets the flip-flop 38.

By the above-mentioned operation, it becomes possible to print the reference mark 19C for the punch holes 19D. It is to be noted that the paper 19 can be detached from the photosensitive drum 3 due to the presence of the non-image printing area 19B.

Although the aforementioned embodiments refer to the laser printer, the signals LGATE and FGATE are applicable to image printing system employing, as a light source of the exposure, a liquid crystal device (LCD), a light-emitting diode (LED), a fluorescent lamp diode array (FLDA), an optical fiber tube (OFT), and the like.

The present invention is not limited to the aforementioned embodiments, and variations and modifications may be made without departing from the scope of the present invention.

What is claimed is:

1. An image printing apparatus comprising:
    recording means for optically recording an image on a recording medium for every scanning line in synchronism with a write clock signal, by turning ON/OFF a light source included therein in accordance with an image signal supplied thereto;
    printing means for printing said image formed on said recording medium on paper while transporting said paper;
    first write-width determining means for determining a first write-width in a first direction of said paper by using paper size information for said paper and a first counted value obtained by counting said write clock signal;
    second write-width determining means for determining a second write-width in a second direction of said paper by using said paper size information and a second counted value obtained by counting a number of the recording performed for every scanning line, the second direction being perpendicular to the first direction and corresponding to a direction of a paper transportation; and
    controlling means for controlling said image signal supplied to said light source so as to be recorded on an area of said recording medium corresponding to an area on said paper defined by the first and second write widths supplied from the first and second write-width determining means.

2. An image recording apparatus as claimed in claim 1, further comprising synchronization detecting means for producing a synchronization detecting signal when detecting a synchronization position for every scanning line on said recording medium, and write clock generating means for generating said write clock signal by synchronizing between a reference clock supplied from an external circuit with said synchronization signal.

3. An image printing apparatus as claimed in claim 1, wherein the first write-width determining means comprises counter means for counting said write clock signal, and comparing means for comparing the first counted value supplied from the counter means with said paper size information.

4. An image printing apparatus as claimed in claim 3, wherein said comparing means comprises a first comparator comparing said first counted value with a first value included in said paper size information corresponding to a write starting position in the first direction of said paper, and a second comparator comparing the first counted value with a second value included in said paper size information corresponding to a write ending position in the first direction of said paper.

5. An image printing apparatus as claimed in claim 3, wherein the first write-width determining means comprises a flip-flop having a set terminal to which an output signal of the first comparator means is supplied, and a reset terminal to which an output signal of the second comparator means is supplied, so that an output signal of said flip-flop defines the first write-width in the first direction.

6. An image printing apparatus as claimed in claim 1, wherein said second write-width determining means comprises counter means for counting said synchronization detecting signal obtained for every scanning line, comparing means for comparing the counted value supplied from the counter means with a third value included in said paper size information corresponding to a write ending position in the second direction, and a flip-flop having a set terminal to which an exposure starting signal generated by said controlling means is supplied, and a reset terminal to which an output signal of said comparing means is supplied, so that an output signal of said flip-flop defines the second write-width in the second direction.

7. An image printing apparatus as claimed in claim 6, wherein the first write-width determining means comprises an AND gate which is supplied with the output signal of said flip-flop and an output signal of said second write-width determining means.

8. An image printing apparatus as claimed in claim 3, wherein said second write-width determining means comprises counter means for counting said synchronization detecting signal obtained for every scanning line, first comparing means for comparing the counted value supplied from the counter means with a third value included in said paper size information corresponding to a write starting position in the second direction, and second comparing means for comparing the counted value supplied from the counter means with a fourth value included in said paper size information corresponding to a write ending position.

9. An image printing apparatus as claimed in claim 8, wherein the second write-width determining means comprises a flip-flop having a set terminal to which an output signal of the first comparing means is supplied, and a reset terminal to which an output signal of the second comparing means is supplied, so that an output signal of said flip-flop defines the second write-width in the second direction.

10. An image printing apparatus as claimed in claim 1, wherein said paper size information defines the entire width of said paper in the first direction.

11. An image printing apparatus as claimed in claim 1, wherein said paper size information defines the entire width of said paper in the second direction.

12. An image printing apparatus as claimed in claim 1, wherein said image signal includes data to be printed in the vicinity of paper.

* * * * *